(12) United States Patent
Kwon et al.

(10) Patent No.: US 11,283,134 B2
(45) Date of Patent: Mar. 22, 2022

(54) METHOD FOR MANUFACTURING SEPARATOR, SEPARATOR MANUFACTURED THEREBY, AND ELECTROCHEMICAL DEVICE COMPRISING SAME

(71) Applicant: LG CHEM, LTD., Seoul (KR)

(72) Inventors: Hyejin Kwon, Daejeon (KR); Houngsik Yoo, Daejeon (KR); Su Jin Yoon, Daejeon (KR); Dong Hyun Kim, Daejeon (KR); Hyeon Choi, Daejeon (KR); Jean Lee, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 64 days.

(21) Appl. No.: 16/303,030

(22) PCT Filed: Jan. 18, 2018

(86) PCT No.: PCT/KR2018/000821
§ 371 (c)(1),
(2) Date: Nov. 19, 2018

(87) PCT Pub. No.: WO2018/139805
PCT Pub. Date: Aug. 2, 2018

(65) Prior Publication Data
US 2019/0173069 A1 Jun. 6, 2019

(30) Foreign Application Priority Data

Jan. 26, 2017 (KR) ........................ 10-2017-0012463
Jan. 15, 2018 (KR) ........................ 10-2018-0004846

(51) Int. Cl.
*H01M 50/403* (2021.01)
*H01M 50/446* (2021.01)
(Continued)

(52) U.S. Cl.
CPC ..... *H01M 50/403* (2021.01); *H01M 10/0525* (2013.01); *H01M 50/446* (2021.01); *H01M 50/449* (2021.01)

(58) Field of Classification Search
CPC .. H01M 2/145; H01M 10/0525; H01M 2/166; H01M 2/1686
See application file for complete search history.

(56) References Cited

U.S. PATENT DOCUMENTS

2009/0246640 A1  10/2009  Bak
2011/0027658 A1   2/2011  Kim
(Continued)

FOREIGN PATENT DOCUMENTS

CN  102770984 A  11/2012
CN  103311483 A   9/2013
(Continued)

OTHER PUBLICATIONS

Machine English translation of JP 2012-086490 (Year: 2012).*
(Continued)

*Primary Examiner* — Michael L Dignan
(74) *Attorney, Agent, or Firm* — Birch, Stewart, Kolasch & Birch, LLP

(57) ABSTRACT

A method for preparing a separator, a separator prepared using the same, and an electrochemical device including the same. More specifically, stability of the separator may be reinforced by preparing the separator using a slurry prepared by pre-dispersing an inorganic material and a dispersion resin, and then mixing a binder thereto when preparing the separator.

12 Claims, 7 Drawing Sheets

(51) Int. Cl.
H01M 50/449 (2021.01)
H01M 10/0525 (2010.01)

(56) References Cited

U.S. PATENT DOCUMENTS

| | | | |
|---|---|---|---|
| 2012/0090758 A1 | 4/2012 | Lee et al. | |
| 2012/0115036 A1 | 5/2012 | Lee et al. | |
| 2013/0244080 A1 | 9/2013 | Song et al. | |
| 2014/0220411 A1* | 8/2014 | Lee | H01M 2/16 |
| | | | 429/144 |
| 2014/0295285 A1* | 10/2014 | Lee | H01M 50/411 |
| | | | 429/246 |
| 2015/0030933 A1* | 1/2015 | Goetzen | C09D 153/00 |
| | | | 429/231.95 |
| 2015/0221917 A1* | 8/2015 | Sakamoto | B32B 27/32 |
| | | | 429/249 |
| 2015/0303427 A1* | 10/2015 | Hyun | H01M 2/166 |
| | | | 429/145 |
| 2016/0190535 A1 | 6/2016 | Fukuchi | |
| 2017/0263907 A1* | 9/2017 | Ameyama | H01M 50/446 |
| 2018/0190958 A1 | 7/2018 | Yoon et al. | |
| 2018/0233725 A1* | 8/2018 | Yasuda | H01M 50/409 |
| 2019/0221807 A1* | 7/2019 | Oura | H01M 50/449 |

FOREIGN PATENT DOCUMENTS

| | | |
|---|---|---|
| CN | 103647035 A | 3/2014 |
| CN | 104584267 A | 4/2015 |
| EP | 2541644 A2 | 1/2013 |
| EP | 3 579 301 A1 | 12/2019 |
| JP | 2012-86490 A | 5/2012 |
| KR | 10-2009-0103010 A | 10/2009 |
| KR | 10-2011-0097714 A | 8/2011 |
| KR | 10-1125013 B1 | 3/2012 |
| KR | 10-1298340 B1 | 8/2013 |
| KR | 10-2013-0105334 A | 9/2013 |
| KR | 10-1330675 B1 | 11/2013 |
| KR | 10-2014-0060796 A | 5/2014 |
| KR | 10-2015-0001963 A | 1/2015 |
| KR | 10-2016-0079623 A | 7/2016 |
| KR | 10-2016-0118979 A | 10/2016 |
| KR | 10-2016-0129868 A | 11/2016 |
| KR | 10-2016-0131761 A | 11/2016 |
| KR | 10-2016-0133276 A | 11/2016 |
| KR | 10-2017-0007211 A | 1/2017 |
| KR | 10-2017-0009534 A | 1/2017 |
| KR | 10-2017-0071204 A | 6/2017 |

OTHER PUBLICATIONS

Kim et al. "Effects of polysaccharides on the rheology of alumina slurries." Journal of the European Ceramic Society 20 (2000) 259-266. (Year: 2000).*
Schilling et al. "The rheology of alumina suspensions: influence of polysaccharides." Journal of the European Ceramic Society 22 (2002) 923-931. (Year: 2002).*
Extended European Search Report, dated Jul. 18, 2019, for European Application No. 18744663.8.
International Search Report for PCT/KR2018/000821 (PCT/ISA/210) dated May 4, 2018.
Chinese Office Action and Search Report, dated Jan. 5, 2021, for Chinese Application No. 201880002333.4., with an English translation.
European Office Action dated Oct. 15, 2021 for Application No. 16 744 663.8.
Chinese Office Action and Search Report for Chinese Application No. 201880002333.4, dated Jul. 5, 2021, with English translation of the Office Action.

* cited by examiner

【Figure 1】
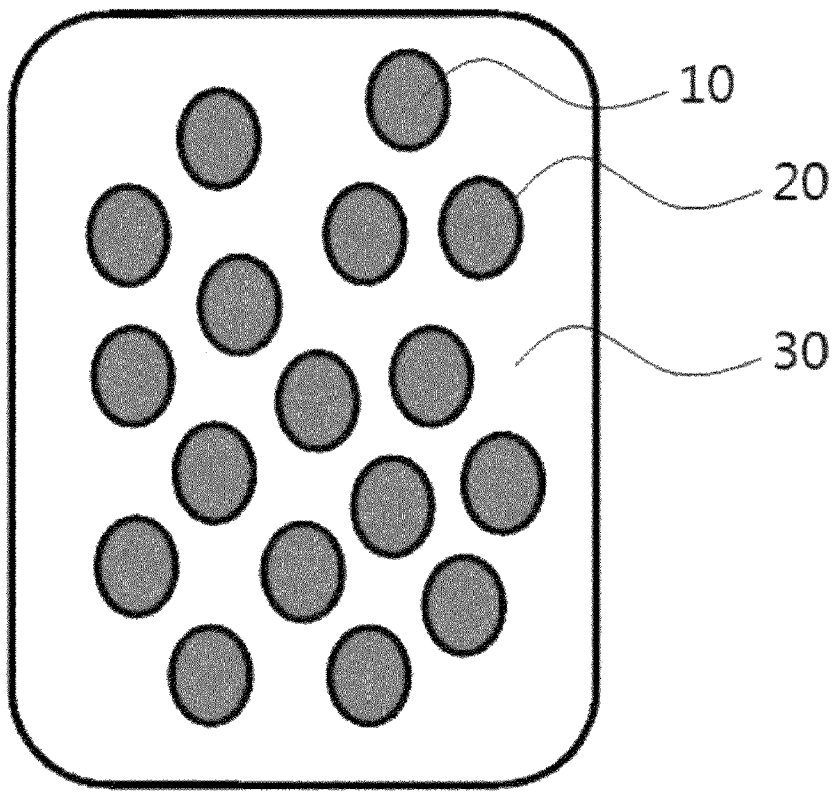
【Figure 2】
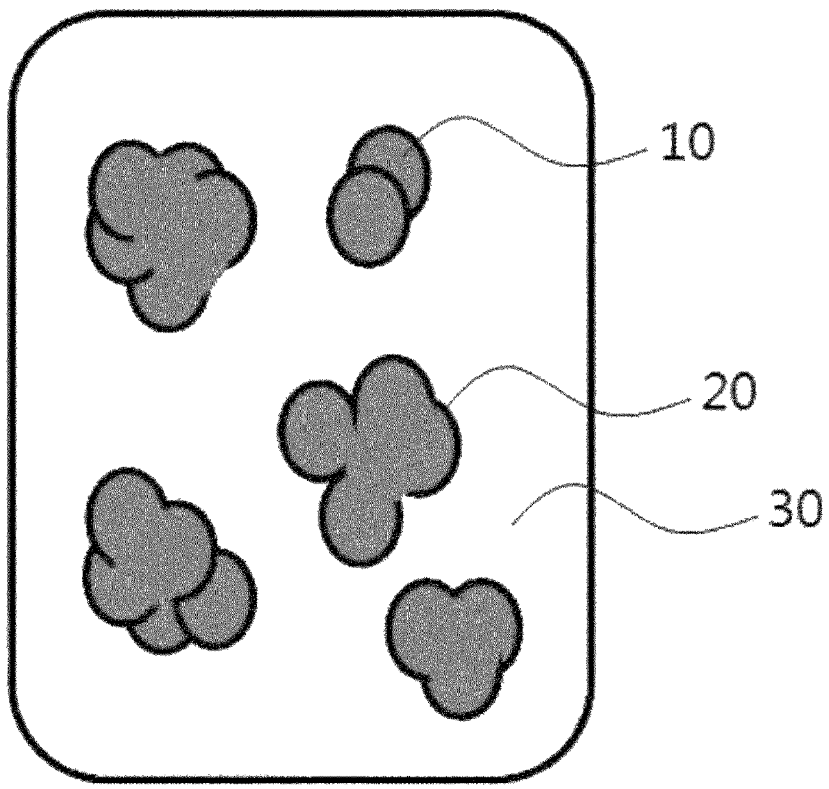

【Figure 3a】
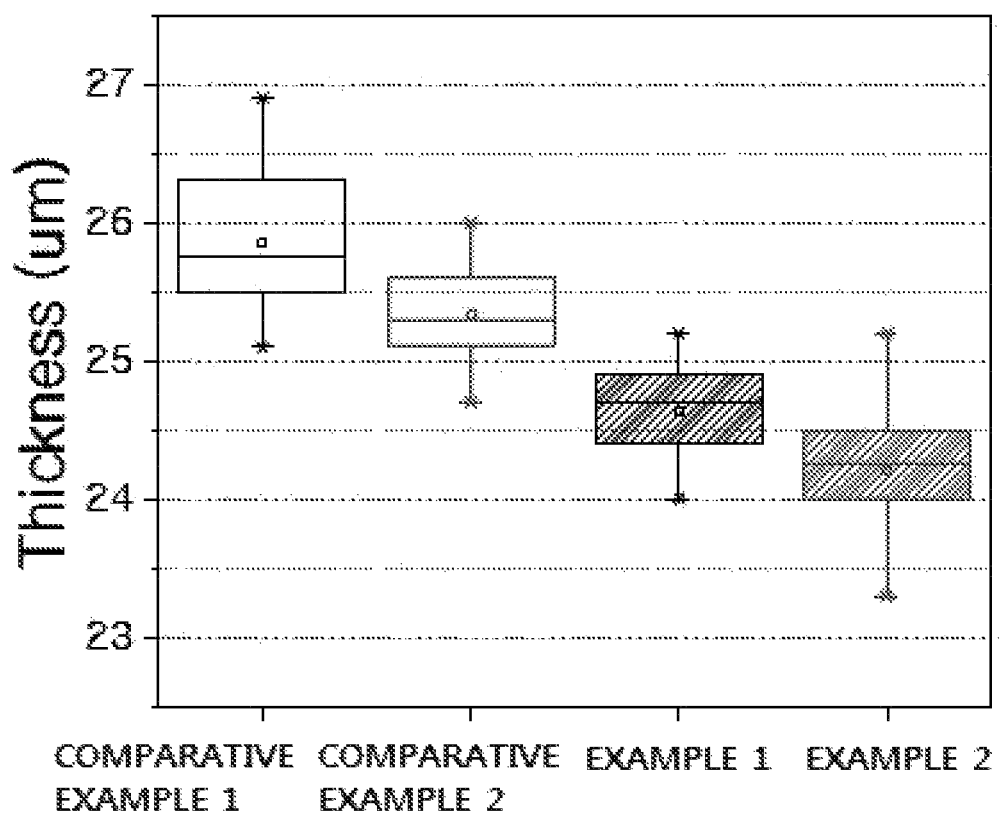

[Figure 3b]
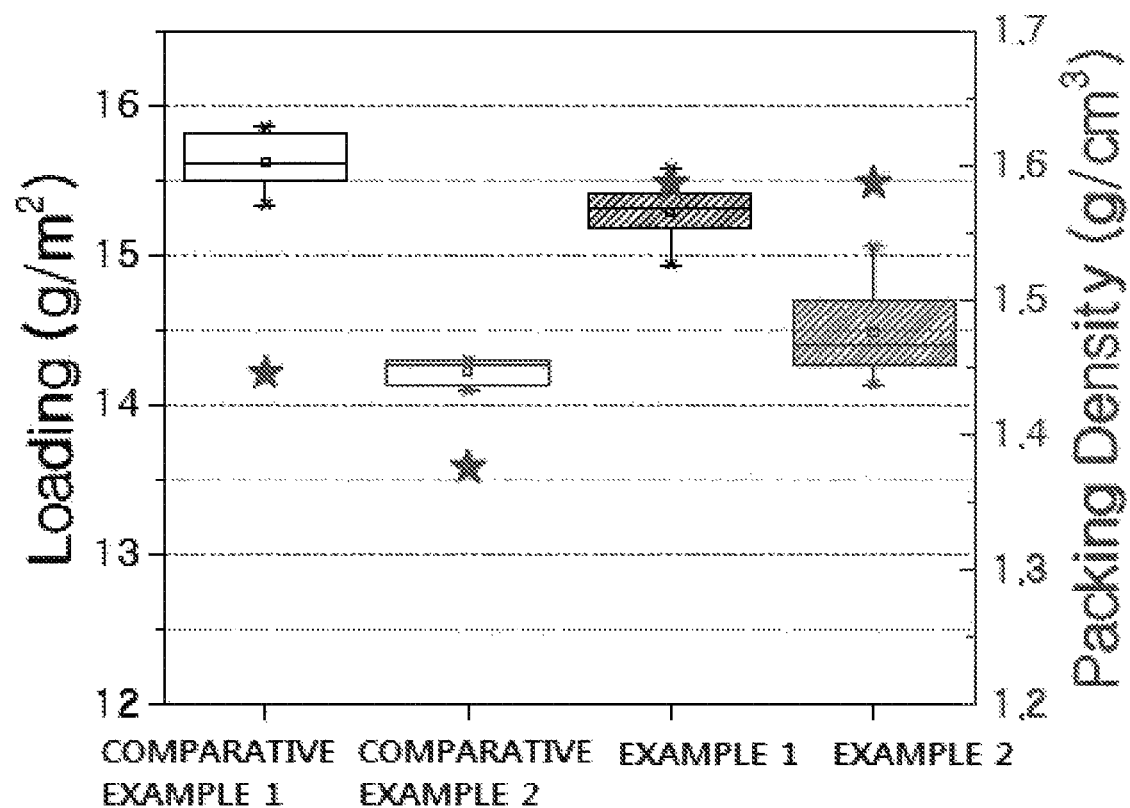

[Figure 3c]
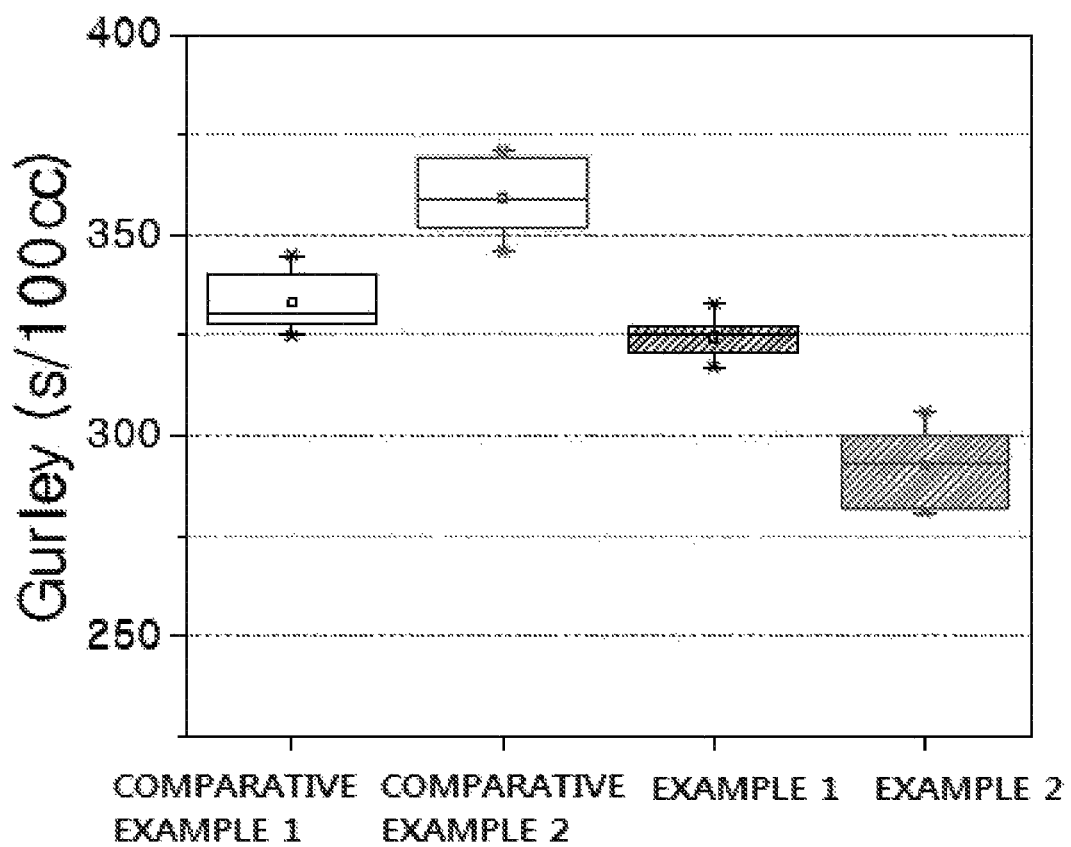

[Figure 3d]
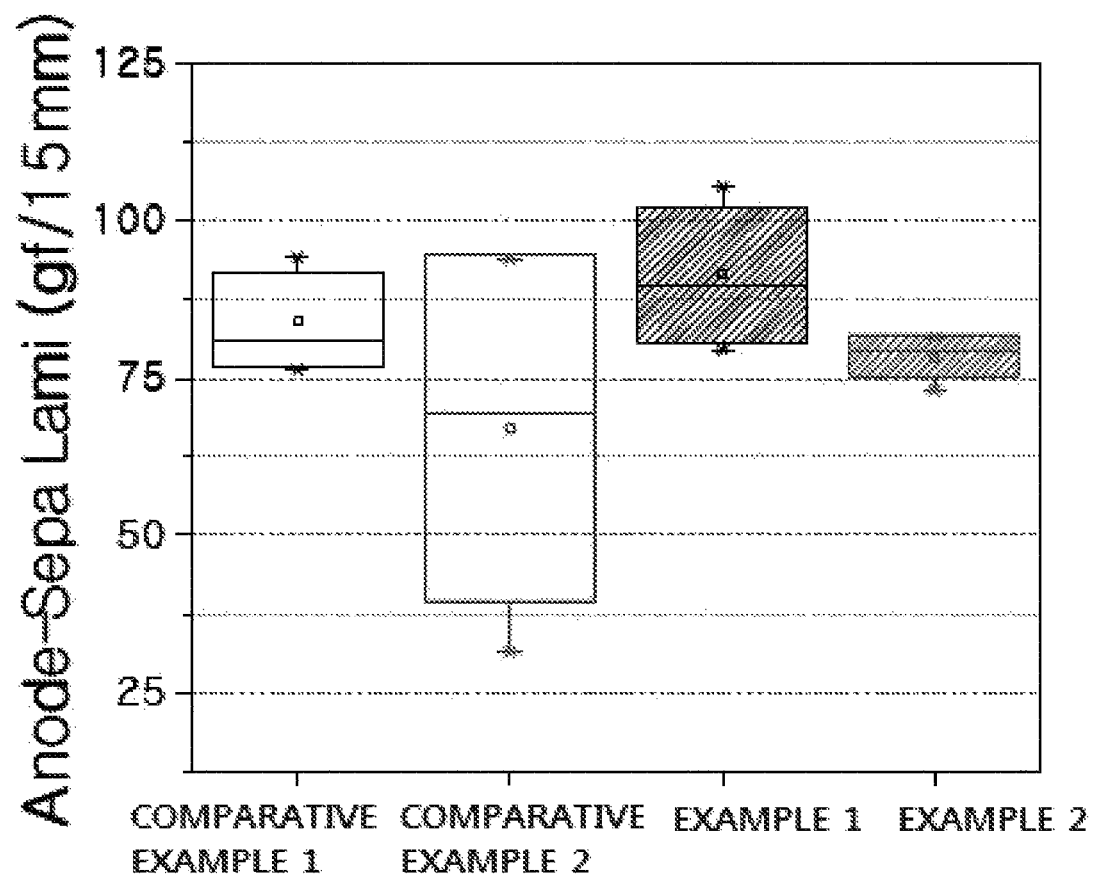

[Figure 3e]
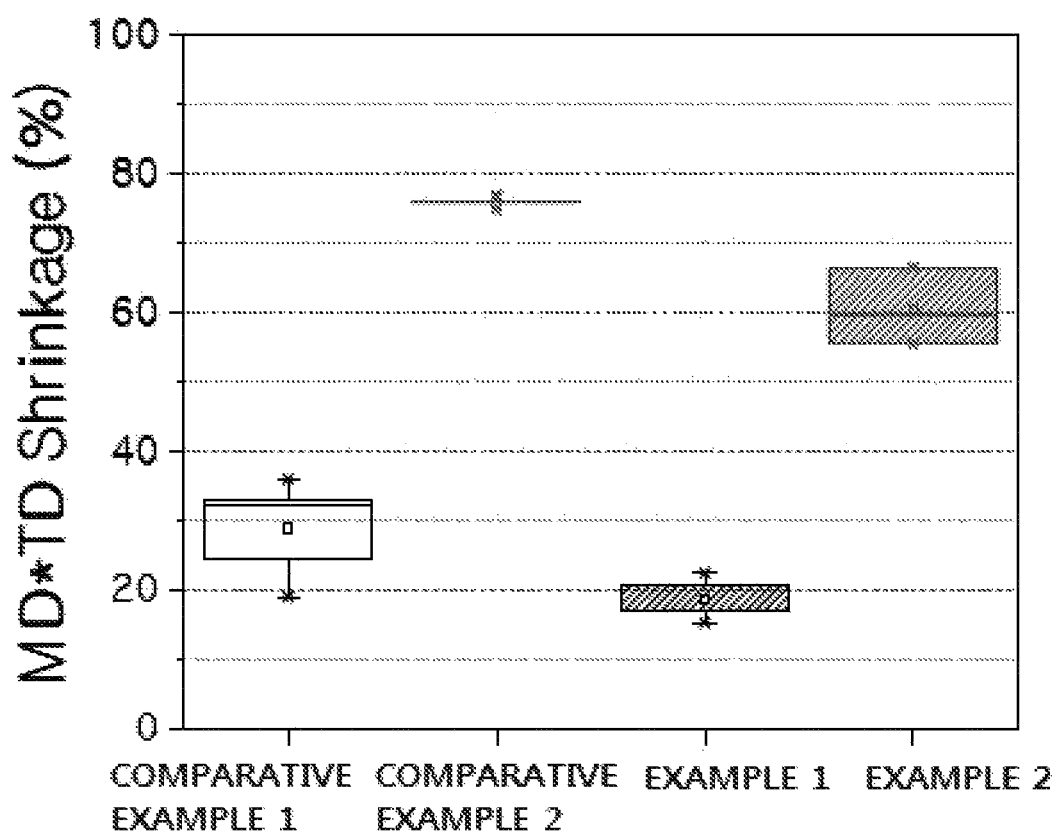

[Figure 4]
| (a) EXAMPLE 1 | (b) COMPARATIVE EXAMPLE 1 |
|---|---|
| 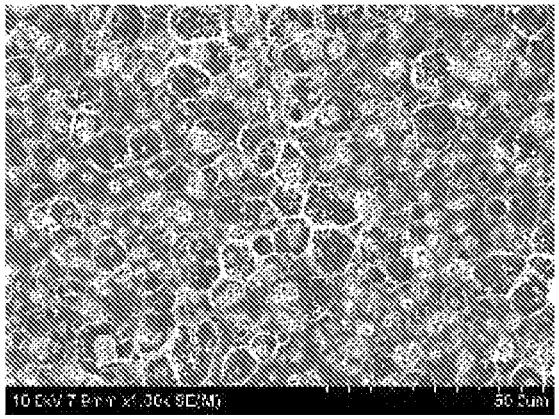 | 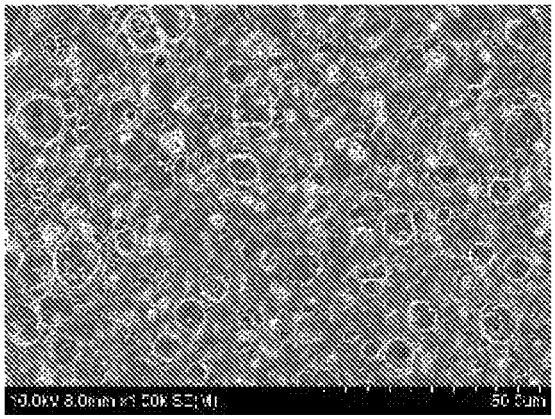 |
| 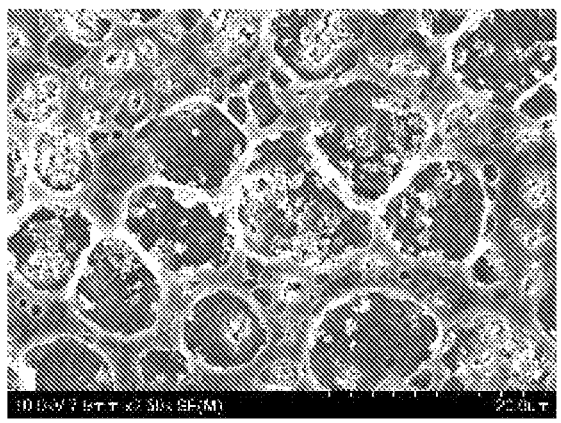 | 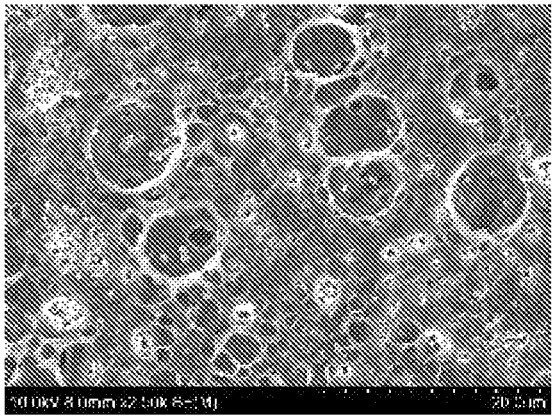 |
| 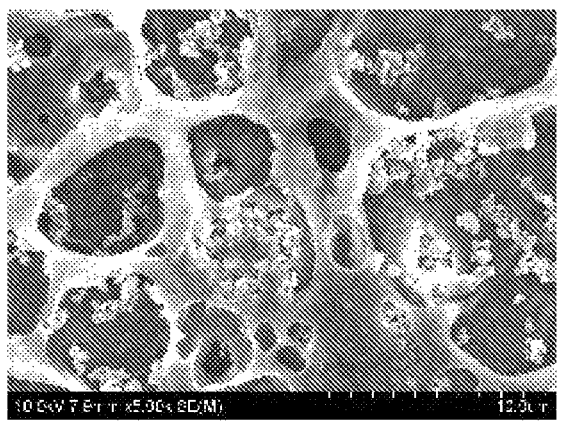 | 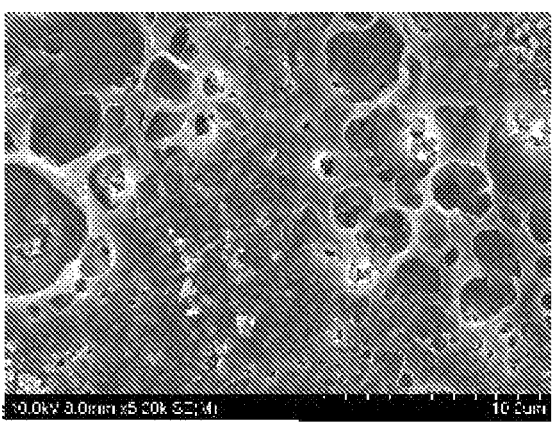 |

METHOD FOR MANUFACTURING SEPARATOR, SEPARATOR MANUFACTURED THEREBY, AND ELECTROCHEMICAL DEVICE COMPRISING SAME

TECHNICAL FIELD

This application claims priority to and the benefits of Korean Patent Application No. 10-2017-0012463, filed with the Korean Intellectual Property Office on Jan. 26, 2017, and Korean Patent Application No. 10-2018-0004846, filed with the Korean Intellectual Property Office on Jan. 15, 2018, the entire contents of which are incorporated herein by reference.

The present invention relates to a method for preparing a separator usable in an electrochemical device, a separator prepared using the same, and an electrochemical device including the same.

BACKGROUND ART

Interests in energy storage technologies have been increasingly growing recently. As applications have expanded to energy of mobile phones, camcorders and notebook PCs, and furthermore, to electric vehicles, efforts on the research and development of electrochemical devices have been more and more materialized.

Electrochemical devices are fields receiving most attention in such aspects and among these, development of secondary batteries capable of charge and discharge have been the focus of attention, and developing such batteries has been progressed to research and development on the design of new electrodes and batteries for enhancing capacity density and specific energy.

Among currently used secondary batteries, lithium secondary batteries developed in early 1990s have received attention with advantages of having high operating voltage and significantly higher energy density compared to conventional batteries such as Ni-MH, Ni—Cd and sulfuric acid-lead batteries using an aqueous solution liquid electrolyte.

Electrochemical devices such as above have been produced in many companies, however, they are very different in their safety features.

For such electrochemical devices, evaluating safety and securing safety are very important. A most important consideration is not to inflict an injury on a user in case of an electrochemical device malfunction, and for such a purpose, ignition and smoking generation and the like in an electrochemical device have been strictly regulated in the safety requirement. In the safety features of an electrochemical device, there is great concern for explosion when thermal runaway occurs due to electrochemical device overheating, or a separator is penetrated.

Meanwhile, as a separator of an electrochemical device, a porous non-woven fabric substrate may be used for saving manufacturing costs. However, a separator using a porous non-woven fabric substrate has a problem of being fractured when manufacturing an electrochemical device due to a weakness of weak mechanical strength. In addition thereto, a leak current may be generated when operating an electrochemical device since pore sizes of the non-woven fabric substrate are large, which resultantly causes a problem of decreasing an insulating property of a separator.

In order to form a coating layer of a stability reinforced separator (SRS) currently mass-produced, a method of mixing a binder and a dispersion resin and dissolving the mixture in a solvent, and adding an inorganic material thereto has been used when preparing slurry for forming a coating layer.

However, in this case, the dispersion resin is not able to surround the inorganic material while being mixed with the binder, and more dispersion resin than is necessary is added, and excessive energy may be consumed in a process for dispersing the inorganic material.

Accordingly, development of technologies capable of efficiently dispersing an inorganic material used when preparing slurry for forming a coating layer of a stability reinforced separator has been required.

PRIOR ART DOCUMENTS

Patent Documents (Patent Document 1) Korean Patent Application Laid Open Publication No. 2009-0103010, "Electrode assembly and lithium secondary battery provided with the same"

DISCLOSURE

Technical Problem

As a result of extensive studies in view of the above, the inventors of the present invention have identified that, by forming a coating layer on a separator usable in an electrochemical device, and specifically, by pre-dispersing a slurry inorganic material for forming a coating layer and a dispersion resin and then mixing a binder thereto to prepare slurry, the inorganic material may be efficiently surrounded with just a small amount of the dispersion resin enhancing dispersion efficiency, which resultantly improves phase stability by reducing particle sizes of the slurry for forming a coating layer, and as a result, energy consumed in a dispersion process may be reduced when preparing slurry for forming a separator coating layer.

Accordingly, an aspect of the present invention provides a method for preparing a separator capable of enhancing process efficiency when preparing a separator used in an electrochemical device.

Another aspect of the present invention provides a separator prepared using such a method for preparing a separator.

Still another aspect of the present invention provides an electrochemical device including the separator.

Technical Solution

According to an aspect of the present invention, there is provided a method for preparing a separator including (S1) obtaining a dispersion solution by dispersing an inorganic material and a dispersion resin into a solvent; (S2) forming slurry by mixing a binder to the dispersion solution; and (S3) forming a coating layer by coating the slurry on at least one surface of a substrate.

Herein, the dispersion resin may be a cyano resin including a —CN group, and may preferably be a cyano resin including a —CN group and an —OH group. The cyano resin may be one or more types selected from the group consisting of cyanoethyl pullulan, cyanoethyl polyvinyl alcohol, cyanoethyl cellulose and cyanoethyl sucrose.

In addition, a content of the dispersion resin in the slurry may be from 1% by weight to 3% by weight.

According to another aspect of the present invention, there is provided a separator prepared using the method for preparing a separator.

According to still another aspect of the present invention, there is provided an electrochemical device including a positive electrode, a negative electrode, and a separator provided between the positive electrode and the negative electrode, and the electrochemical device may be a lithium ion battery.

Advantageous Effects

According to a method for preparing a separator of the present invention, by a process of pre-dispersing an inorganic material and a dispersion resin into a solvent and mixing a binder thereto afterward when preparing slurry for forming a coating layer of a separator, the dispersion resin efficiently surrounds the inorganic material. Accordingly, agglomeration of the inorganic material may be prevented, and particle sizes of the slurry become smaller and phase stability thereof becomes favorable.

In addition, the inorganic material can be effectively dispersed in the solvent with just a small amount of the dispersion resin, and therefore, raw material costs and energy required in the process can be saved.

The separator prepared as above has reinforced stability, and when used in an electrochemical device, thermal and electrochemical stability and performance of the electrochemical device can be enhanced.

DESCRIPTION OF DRAWINGS

FIG. 1 is a mimetic diagram presenting a form of particles including an inorganic material and a dispersion resin surrounding the inorganic material being dispersed into a solvent when preparing slurry for forming a coating layer of a separator according to Example 1 of the present invention.

FIG. 2 is a mimetic diagram presenting a form of particles including an inorganic material and a dispersion resin surrounding the inorganic material being dispersed into a solvent when preparing slurry for forming a coating layer of a separator according to Comparative Example 1 of the present invention.

FIG. 3a is a graph showing a thickness of a coating layer of a separator prepared in examples and comparative examples.

FIG. 3b is a graph showing loading and packing density of a coating layer of a separator prepared in examples and comparative examples.

FIG. 3c is a graph showing an aeration time (Gurley) of a coating layer of a separator prepared in examples and comparative examples.

FIG. 3d is a graph showing adhesive strength (Anode-Sepa Lami) of, when laminating a coating layer of a separator prepared in examples and comparative examples on a negative electrode, the coating layer with the negative electrode.

FIG. 3e is a graph showing a shrinkage rate (MD*TD Shrinkage) of a separator prepared in examples and comparative examples.

FIG. 4 shows scanning electron microscope (SEM) images on a surface of a coating layer of a separator prepared in each of Example 1 and Comparative Example 1 ((a): Example 1, (b): Comparative Example 1).

BEST MODE

Hereinafter, the present invention will be described in more detail in order to illuminate the present invention.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Method for Preparing Separator

The present invention relates to a method for preparing a separator usable in an electrochemical device, and the method for preparing a separator may include (S1) obtaining a dispersion solution by dispersing an inorganic material and a dispersion resin into a solvent; (S2) forming slurry by mixing a binder to the dispersion solution; and (S3) forming a coating layer by coating the slurry on at least one surface of a substrate.

Hereinafter, the method for preparing a separator according to the present invention will be described in detail step by step.

In (S1), a dispersion solution may be obtained by dispersing an inorganic material and a dispersion resin into a solvent.

When only the inorganic material and the dispersion resin are dispersed first into the solvent, the dispersion resin may effectively surround a surface of the inorganic material compared to when a binder is dispersed together. Accordingly, agglomeration of the inorganic material is prevented, reducing particle sizes of prepared slurry and enhancing phase stability thereof.

In addition, the inorganic material can be efficiently dispersed into the solvent with just a small amount of the dispersion resin, and therefore, raw material costs and energy consumed in the dispersion process can be saved.

The inorganic material may be inorganic material particles, and the inorganic material particles are not particularly limited as long as they are electrochemically stable. In other words, the inorganic material particles that may be used in the present invention are not particularly limited as long as an oxidation and/or reduction reaction does not occur in an operating voltage range (for example, 0 V to 5 V based on $Li/Li^+$) of a battery used. Particularly, using inorganic material particles having a high dielectric constant as the inorganic material particles contributes to an increase in the dissociation of an electrolyte salt in a liquid electrolyte, for example, a lithium salt, and may enhance ion conductivity of the liquid electrolyte.

With the above-described reasons, the inorganic material particles may include high dielectric constant inorganic material particles having a dielectric constant of 5 or greater, and preferably 10 or greater. The inorganic material particles having a dielectric constant of 5 or greater may be one or more types selected from the group consisting of $SrTiO_3$, $SnO_2$, $CeO_2$, $MgO$, $NiO$, $CaO$, $ZnO$, $ZrO_2$, $SiO_2$, $Y_2O_3$, $Al_2O_3$, $AlOOH$, $Al(OH)_3$, $TiO_2$, $SiC$, $BaTiO_3$, $Pb(Zr_x, Ti_{1-x})O_3$ (PZT, herein, $0<x<1$), $Pb_{1-x}La_xZr_{1-y}Ti_yO_3$ (PLZT, herein, $0<x<1$, $0<y<1$), $(1-x)Pb(Mg_{1/3}Nb_{2/3})O_{3-x}PbTiO_3$ (PMN-PT, herein, $0<x<1$) and $HfO_2$, but are not limited thereto, and electrochemically stable inorganic material particles having a dielectric constant of 5 or greater may be widely used.

In addition, inorganic material particles having a lithium ion transfer ability, that is, inorganic material particles containing a lithium element but having a function of transferring lithium ions instead of storing the lithium may be used. The inorganic material particles having a lithium ion transfer ability may include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$-based glass ($Li_xSi_yS_z$, $0<x<3$, $0<y<2$, $0<z<4$) such as $Li_3PO_4$-$Li_2S$—$SiS_2$, $P_2S_5$-based glass ($Li_xP_yS_z$, $0<x<3$, $0<y<3$, $0<z<7$) such as $LiI$-$Li_2S$—$P_2S_5$, or mixtures thereof.

The particle diameters of the inorganic material particles are not particularly limited, but may be from 0.001 μm to 100 μm so that the inorganic material particles are efficiently dispersed inside the coating layer. For example, when the particle diameters of the inorganic material particles are less than 0.001 μm, phase stability of the slurry may decline due to particle agglomeration, and when the particle diameters are greater than 100 μm, it may be difficult to carry out a coating process.

The inorganic material as described above may be used in 10% by weight to 20% by weight.

In the present invention, the dispersion resin may be a cyano resin including a —CN group, and in addition, the dispersion resin may be a cyano resin including both a —CN group and an —OH group.

The —CN group is hydrophobic exhibiting a friendly property with a substrate and a binder, and enables uniform dispersion of the inorganic material particles. In addition, the —OH group is hydrophilic exhibiting an inorganic material-friendly property leading to favorable coatability for the inorganic material surface, which is advantageous in reducing particle sizes of the slurry particles.

The cyano resin may be one or more types selected from the group consisting of acrylonitrile, cyanoethyl pullulan, cyanoethyl polyvinyl alcohol, cyanoethyl cellulose and cyanoethyl sucrose.

In addition, the dispersion resin has a molecular weight of 200,000 or greater, which is effective for enhancing adhesive strength between a separator and an electrode and decreasing a shrinkage rate.

The dispersion resin content in the slurry may be from 0.1% by weight to 3% by weight. When the dispersion resin content is less than 0.1% by weight, the dispersion resin has a relatively smaller weight than the inorganic material, and is not able to sufficiently surround the inorganic material surface, which may lead to agglomeration of the inorganic material particles or a decrease in the dispersion efficiency, and when the content is greater than 3% by weight, the weight of the dispersion resin is excessive causing re-agglomeration of the remaining dispersion resin after dispersing the inorganic material, which may decline performance of an electrochemical device.

As the solvent, solvents having a low boiling point may be used so that the solvent may be readily removed after preparing a separator. Specifically, the solvent may be selected from the group consisting of acetone, methanol, ethanol, tetrahydrofuran, methylene chloride, chloroform, dimethylformamide, N-methyl-2-pyrrolidone (NMP), cyclohexane and water.

Such a solvent may be used in 69% by weight to 89% by weight considering uniform dispersion of the slurry particles.

When forming a dispersion solution by dispersing the inorganic material and the dispersion resin as described above into the solvent, a milling process may be used for the dispersion to enhance dispersion efficiency, however, dispersion methods used for inorganic material dispersion may be widely used.

Meanwhile, when using two or more types of inorganic materials, the two or more types of inorganic materials need to be mixed, and then pre-dispersed into the solvent with the dispersion resin to have an advantage in decreasing particle sizes of the slurry particles.

Subsequently, in (S2), slurry may be formed by mixing a binder to the dispersion solution.

The binder may be one or more types selected from the group consisting of polyvinylidene fluoride (PVDF), chlorotrifluoroethylene (CTFE), polyethylene glycol (PEG), polypropylene glycol (PPG), toluene diisocyanate (TDI), polymethyl methacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, pullulan, carboxymethyl cellulose, an acrylonitrile-styrene-butadiene copolymer and polyimide.

When forming the slurry, the binder may be mixed in an amount of 0.3% by weight to 8% by weight, and when the binder is mixed in less than 0.3% by weight, the inorganic material may be peeled off from a substrate after coating the slurry on the substrate, and when mixed in greater than 8% by weight, the binder may function as resistance in a battery.

The slurry may be formed by the slurry particles being connected by the binder, and herein, the slurry particles mean particles prepared in (S1) including an inorganic material and a dispersion resin layer surrounding the inorganic material.

Particle sizes of the slurry particles included in the slurry may be from 1 μm to 3 μm. When the particle sizes of the slurry particles are less than 1 μm, the number of fine particles increases making uniform dispersion difficult, and when the particle sizes are greater than 3 μm, the particle sizes increase reducing phase stability.

Meanwhile, when mixing the binder to the dispersion solution, the slurry particles sink at a proper rate inside the binder, and the slurry particles enhance a degree of dispersion inside the binder enabling to prepare uniform slurry, and therefore, separator stability may be reinforced.

Herein, the slurry particles may have a sedimentation rate of 1.5 μm/s or lower, and the sedimentation rate decreasing within the range of 1.5 μm/s or lower is advantageous in uniform dispersion of the slurry particles, and enhancing phase stability thereof resulted therefrom. Specifically, the sedimentation rate may be greater than 0 μm/s and less than or equal to 1.5 μm/s, preferably from 0.1 μm/s to 1 μm/s and more preferably from 0.2 μm/s to 0.5 μm/s.

Subsequently, in (S3), the slurry may be coated on at least one surface of a substrate to form a coating layer having a thickness of 20 μm to 25 μm.

Herein, the coating method may be one or more types selected from the group consisting of spray, inkjet, laser printing, screen printing and dispensing methods, but is not limited thereto.

The substrate may be a polyolefin-based substrate commonly used in the art, and specifically a substrate including one or more types selected from the group consisting of high density polyethylene, linear low density polyethylene, low density polyethylene, ultra-high molecular weight polyethylene, polypropylene and derivatives thereof.

The substrate may have a thickness of 1 μm to 100 μm. When the substrate has a thickness of less than 1 μm, mechanical properties may be difficult to maintain, and when the thickness is greater than 100 μm, the substrate may function as a resistive layer.

A coating layer may be formed by coating the slurry on at least one surface of the substrate, and then drying the result.

Separator

The present invention also relates to a separator prepared using a method for preparing a separator such as described above.

The separator includes a substrate, and a coating layer coated on at least one surface of the substrate, and the coating layer may include core-shell-type slurry particles including a core including an inorganic material, and a shell including a dispersion resin surrounding the core.

The content and the specific types of materials forming the substrate and the coating layer are the same as described above.

In the separator according to the present invention, particle sizes of the slurry particles included in the coating layer are small of approximately 1 μm to 3 μm, and therefore, a property of reinforcing stability of the separator may be obtained due to excellent phase stability. In addition, raw material costs and energy consumed in the process may be saved since the amount of dispersant used in preparing the separator is small.

Electrochemical Device

The present invention also relates to an electrochemical device including a separator such as described above, and the electrochemical device may include a positive electrode, a negative electrode, and a separator provided between the positive electrode and the negative electrode.

The electrochemical device may be a lithium ion battery, and the lithium ion battery may have enhanced thermal and electrochemical stability and battery performance at the same time by using a separator with reinforced stability.

Mode for Invention

Hereinafter, preferred examples will be provided in order to illuminate the present invention, however, the following examples are for illustrative purposes only, and it will be obvious to those skilled in the art that various changes and modifications may be made within the scope and technological ideas of the present invention, and such changes and modifications also belong to the scope of the attached claims.

In the following examples and comparative examples, separators were prepared in the compositions and dispersion orders as described in the following Table 1.

TABLE 1

|  |  | Example 1 | Example 2 | Comparative Example 1 | Comparative Example 2 |
|---|---|---|---|---|---|
| Inorganic Material Particles 1 | Name | $Al_2O_3$ | $Al_2O_3$ | $Al_2O_3$ | $Al_2O_3$ |
|  | Weight | 11.9% by weight | 12.0% by weight | 11.9% by weight | 12.0% by weight |
|  | Particle Diameter | 5 μm | 5 μm | 5 μm | 5 μm |
| Inorganic Material Particles 2 | Name | AlOOH | AlOOH | AlOOH | AlOOH |
|  | Weight | 2.1% by weight | 2.1% by weight | 2.1% by weight | 2.1% by weight |
|  | Particle Diameter | 5 μm | 5 μm | 5 μm | 5 μm |
| Dispersion Resin | Name | Cyanoethyl Pullulan | Cyanoethyl Pullulan | Cyanoethyl Pullulan | Cyanoethyl Pullulan |
|  | Weight | 0.4% by weight | 0.3% by weight | 0.4% by weight | 0.3% by weight |
| Binder | Name | PVDF | PVDF | PVDF | PVDF |
|  | Weight | 3.6% by weight | 3.6% by weight | 3.6% by weight | 3.6% by weight |
| Solvent | Name | Acetone | Acetone | Acetone | Acetone |
|  | Weight | 82% by weight | 82% by weight | 82% by weight | 82% by weight |
| Solvent Dispersion |  | Pre-dispersion ○ Pre-dispersing Inorganic Material and Dispersion Resin | Pre-dispersion ○ Pre-dispersing Inorganic Material and Dispersion Resin | Pre-dispersion × After Dispersing Dispersion Resin and Binder, Mixing Inorganic Material | Pre-dispersion × After Dispersing Dispersion Resin and Binder, Mixing Inorganic Material |

EXAMPLE 1

1-1. Preparation of Dispersion Solution

To a solution dissolving a dispersion resin in a solvent, inorganic material particles were added for pre-dispersion. The result was mixed for 1 hour, milled for 2 hours to prepare a dispersion solution. Herein, by the composition described in Table 1, acetone was used in 82% by weight as the solvent, cyanoethyl pullulan was used in 0.4% by weight as the dispersion resin, and $Al_2O_3$ was used in 11.9% by weight and AlOOH in 2.1% by weight as the inorganic material particles.

1-2. Formation of Slurry

After dispersing all the inorganic materials in the dispersion solution, 3.6% by weight of poly-vinylidene fluoride (PVDF), a binder, was introduced to the dispersion solution, and the result was milled for 20 minutes to prepare slurry.

1-3. Preparation of Separator by Forming Coating Layer

The slurry was coated on one surface of a high density polyethylene substrate using a dip coating method, and the result was dried to form a coating layer, and then a separator was prepared.

EXAMPLE 2

A separator was prepared in the same manner as in Example 1, except that the cyanoethyl pullulan that is the dispersion resin was used in 0.3% by weight.

EXAMPLE 3

A separator was prepared in the same manner as in Example 1, except that the cyanoethyl pullulan that is the dispersion resin was used in 3.5% by weight.

EXAMPLE 4

A separator was prepared in the same manner as in Example 1, except that the cyanoethyl pullulan that is the dispersion resin was used in 0.05% by weight.

Comparative Example 1

A separator was prepared using the same composition and under the same condition as in Example 1, but in a different process order. To a solvent, a dispersion resin and a binder were introduced, the result went through processes of temperature raising and lowering, and then mixed inorganic material particles 1 and 2 were introduced thereto. The result was mixed and milled for 30 minutes to prepare slurry for forming a coating layer, and then a separator was prepared.

Comparative Example 2

A separator was prepared in the same manner as in Comparative Example 1, except that the cyanoethyl pullulan that is the dispersion resin was used in 0.3% by weight.

Comparative Example 3

A separator was prepared in the same manner as in Comparative Example 1, except that the cyanoethyl pullulan that is the dispersion resin was used in 3.5% by weight.

Comparative Example 4

A separator was prepared in the same manner as in Comparative Example 1, except that the cyanoethyl pullulan that is the dispersion resin was used in 0.05% by weight.

EXPERIMENTAL EXAMPLE

Hereinafter, particle sizes and a sedimentation rate were measured for the slurry for forming a coating layer using methods as follows in the experimental example.

In addition, for the coating layer formed on the separator using the slurry for forming a coating layer, the coating layer thickness, loading, packing density, aeration time, adhesive strength with an electrode and shrinkage rate were measured using methods as follows.

(1) Particle Size ($D_{50}$, μm)

Sizes of the slurry particle were measured using a particle size analyzer (PSA, Melbourne).

(2) Sedimentation Rate (μm/s)

A sedimentation rate of the slurry particles was measured using a dispersion stability analyzer (Lumisizer LS651).

(3) Coating Layer Thickness (μm)

A thickness of the coating layer was measured using wVL-50S (Mitutoyo Corporation).

(4) Loading (g/m²)

The separator was cut into 5 cm×5 cm, weights before/after the coating were measured, and this was employed as loading.

(5) Packing Density (g/cm³)

Packing density was calculated according to the following Equation 1.

Packing density=loading/coating layer thickness [Equation 1]

(6) Aeration Time (Gurley, s/100 cc)

An aeration time was measured using an air permeability measuring device (Asahi Seiko Co., Ltd.).

(7) Adhesive Strength (gf/15 mm)

Adhesive strength was evaluated by hot pressing with 8.5 mPa at 90° C., and measuring 180 degree peel-off strength using UTM equipment (LLOYD Instruments, LF plus).

(8) Shrinkage Rate (MD*TD Shrinkage, %)

The 5 cm×5 cm separator sample was stored for 30 minutes in a 150° C. oven, and the shrunk length was measured to calculate a shrinkage rate.

Experimental Example 1: Measurement of Slurry Particle Sizes and Sedimentation Rate Depending on Inorganic Material Dispersion Order and Dispersion Resin Content Particle sizes and a sedimentation rate of the slurry prepared in the examples and the comparative examples were measured, and the results are described in Table 2.

TABLE 2

| | Dispersion Resin Content (% by Weight) | Dispersion Resin Pre-Dispersion | Particle Size ($D_{50}$, μm) | Sedimentation Rate (μm/s) |
|---|---|---|---|---|
| Example 1 | 0.4 | Pre-dispersion ○ | 2.27 | 0.56 |
| Example 2 | 0.3 | Pre-dispersion ○ | 3.66 | 0.47 |
| Example 3 | 3.5 | Pre-dispersion ○ | 5.63 | 2.03 |
| Example 4 | 0.05 | Pre-dispersion ○ | 8.84 | 13.13 |
| Comparative Example 1 | 0.4 | Pre-dispersion × | 3.35 | 1.16 |
| Comparative Example 2 | 0.3 | Pre-dispersion × | 7.35 | 2.81 |
| Comparative Example 3 | 3.5 | Pre-dispersion × | 9.12 | 15.21 |
| Comparative Example 4 | 0.05 | Pre-dispersion × | 12.4 | 20.94 |

Based on the results described in Table 2, it was seen that, when comparing Example 1 and Comparative Example 1 using the same dispersion resin content, the slurry of Example 1 prepared by pre-dispersing an inorganic material with a dispersion resin, and then mixing a binder thereto had reduced particle sizes and sedimentation rate compared to the slurry of Comparative Example 1.

In addition, when comparing Example 2 and Comparative Example 2 using the same dispersion resin content, it was also seen that the slurry of Example 2 prepared by pre-dispersing an inorganic material with a dispersion resin, and then mixing a binder thereto had reduced particle sizes and sedimentation rate compared to the slurry of Comparative Example 2.

It was also seen that Example 3 pre-dispersing an inorganic material together with a dispersion resin and having a high dispersion resin content, and Example 4 having a low dispersion resin content had an increased sedimentation rate and increased slurry particle sizes.

It was also seen that Comparative Example 3 dispersing a dispersion resin and a binder, and then mixing an inorganic material thereto instead of pre-dispersing an inorganic material into a dispersion resin, and having a high dispersion resin content, and Comparative Example 4 having a low dispersion resin also had an increased sedimentation rate and increased slurry particle sizes.

FIG. 1 and FIG. 2 are mimetic diagrams presenting a form of particles including an inorganic material and a dispersion resin surrounding the inorganic material being dispersed into a solvent when preparing the slurry for forming a coating layer of a separator according to Example 1 and Comparative Example 1, respectively, of the present invention.

When referring to FIG. 1, the dispersion resin efficiently surrounds the inorganic material particles when preparing the slurry for forming a coating layer of a separator according to Example 1, and it can be seen that the particle sizes of the slurry particles may be reduced by preventing agglomeration of the inorganic material particles, and as a result, the sedimentation rate may be reduced.

When referring to FIG. 2, it was seen that agglomeration of the inorganic material particles occurs when preparing the slurry for forming a coating layer of a separator according to Comparative Example 1.

Experimental Example 2: Measurement of Separator Coating Layer Properties Depending on Inorganic Material Dispersion Order and Dispersion Resin Content For each of the coating layers of the separators prepared in the examples and the comparative examples, the coating layer thickness, loading, packing density, aeration time, adhesive strength and shrinkage rate were measured, and the results are shown in FIGS. 3a to 3e.

FIG. 3a is a graph showing a thickness of the coating layer of the separator prepared in the examples and the comparative examples.

When referring to FIG. 3a, it was seen that, when comparing each of Example 1 and Comparative Example 1, and Example 2 and Comparative Example 2 using the same dispersion resin content, the coating layers of the separators prepared in Examples 1 and 2 had smaller thicknesses than Comparative Examples 1 and 2.

FIG. 3b is a graph showing loading and packing density of the coating layer of the separator prepared in the examples and the comparative examples.

When referring to FIG. 3b, it was seen that, when comparing each of Example 1 and Comparative Example 1, and Example 2 and Comparative Example 2 using the same dispersion resin content, the coating layers of the separators prepared in Examples 1 and 2 had reduced loading and increased packing density compared to Comparative Examples 1 and 2.

FIG. 3c is a graph showing an aeration time (Gurley) of the coating layer of the separator prepared in the examples and the comparative examples.

When referring to FIG. 3c, it was seen that, when comparing each of Example 1 and Comparative Example 1, and Example 2 and Comparative Example 2 using the same dispersion resin content, the coating layers of the separators prepared in Examples 1 and 2 had a reduced aeration time compared to Comparative Examples 1 and 2.

The aeration time measures a time taken for 100 cc of air to permeate a certain area, and from the aeration time, the degree of porosity of the coating layer may be identified. For example, in Comparative Examples 1 and 2, dispersibility of the slurry particles was not favorable when forming the coating layer of the separator causing agglomeration, which required longer time for air to permeate the coating layer, and the aeration time increased compared to the examples.

FIG. 3d is a graph showing adhesive strength (Anode-Sepa Lami) of, when laminating the coating layer of the separator prepared in the examples and the comparative examples on a negative electrode, the coating layer with the negative electrode.

When referring to FIG. 3d, it was seen that, when comparing each of Example 1 and Comparative Example 1, and Example 2 and Comparative Example 2 using the same dispersion resin content, the coating layers of the separators prepared in Examples 1 and 2 had a reduced deviation in the adhesive strength with the negative electrode compared to Comparative Examples 1 and 2.

FIG. 3e is a graph showing a shrinkage rate (MD*TD Shrinkage) of the separator prepared in the examples and the comparative examples.

When referring to FIG. 3e, it was seen that, when comparing each of Example 1 and Comparative Example 1, and Example 2 and Comparative Example 2 using the same dispersion resin content, the coating layers of the separators prepared in Examples 1 and 2 had a reduced shrinkage rate compared to Comparative Examples 1 and 2. From these results, it was identified that the coating layers of the separators prepared in Examples 1 and 2 had reinforced thermal stability.

Experimental Example 3: Observation on Separator Coating Layer Surface Depending on Inorganic Material Dispersion Order and Dispersion Resin Content FIG. 4 shows scanning electron microscope (SEM) images on the coating layer surface of the separator prepared in each of Example 1 and Comparative Example 1 ((a): Example 1, (b): Comparative Example 1).

When referring to FIG. 4(a), it was seen that the inorganic material particles were uniformly dispersed in the separator coating layer prepared in Example 1.

Meanwhile, when referring to FIG. 4(b), it was seen that agglomeration of the inorganic material particles was observed in the separator coating layer prepared in Comparative Example 1, and sizes of the particles were larger compared to Example 1.

Comparative Example 5

A separator was prepared using the same composition as in Example 1, while a first dispersion solution pre-dispersing inorganic material particles 1 ($Al_2O_3$) into a solvent with a dispersion resin was prepared, a second dispersion solution pre-dispersing inorganic material particles 2 (AlOOH) into a solvent with a dispersion resin was prepared, these first dispersion solution and second dispersion solution were mixed, and a binder was added thereto to prepare slurry, and a separator using the same was prepared.

Comparative Example 6

A separator was prepared using the same composition as in Example 1, while a first dispersion solution pre-dispersing inorganic material particles 1 ($Al_2O_3$) into a solvent with a dispersion resin was prepared, and then a binder was added thereto to prepare first slurry. In addition, a second dispersion solution pre-dispersing inorganic material particles 2 (AlOOH) into a solvent with a dispersion resin was prepared, and then a binder was added thereto to prepare second slurry.

Mixed slurry prepared by mixing these first slurry and second slurry was used to prepare a separator.

Experimental Example 4: Measurement of Slurry Particle Sizes Depending on Process Order when Using Two Types of Inorganic Material Particles For each of the separators prepared in Example 1, Comparative Example 1, Comparative Example 5 and Comparative Example 6, particle sizes of the pre-dispersion solution and the slurry formed during a process for preparing the slurry for forming a coating layer of the separator were each measured, and the results are described in the following Table 3.

TABLE 3

| | | Particle Size ($D_{50}$, μm) | |
|---|---|---|---|
| | Process Order | Dispersion Solution after Pre-dispersion | Slurry |
| Example 1 | 1) Mix inorganic material particles 1 and 2<br>2) Pre-disperse dispersion resin and inorganic material particles<br>3) Add binder to prepare slurry | 1.98 | 4.11 |
| Comparative Example 1 | 1) Mix inorganic material particles 1 and 2<br>2) Mix inorganic material particles, dispersion resin and binder to prepare slurry | — | 3.94 |
| Comparative Example 5 | 1) Prepare first dispersion solution of inorganic material particles 1 by pre-dispersion<br>2) Prepare second dispersion solution of inorganic material particles 2 by pre-dispersion<br>3) Mix first dispersion solution and second dispersion solution<br>4) Add binder to prepare slurry | 10.40 | 10.80 |
| Comparative Example 6 | 1) Prepare first slurry of inorganic material particles 1 by pre-dispersion<br>2) Prepare second slurry of Inorganic material particles 2 by pre-dispersion<br>3) Prepare mixed slurry of first slurry and second slurry | — | 11.3 |

Based on the results described in Table 3, it was seen that, when forming a separator coating layer using two types of inorganic material particles, the slurry of Example 1 prepared by mixing two types of inorganic material particles, and pre-dispersing into a solvent with a dispersion resin had smaller particle sizes.

Hereinbefore, the present invention has been described with limited examples and drawings, however, the present invention is not limited thereto, and various modifications and changes may be made by those skilled in the art within technological ideas of the present invention and the range of equivalents of the attached claims to describe below.

10: inorganic material particles
20: dispersion resin
30: binder

The invention claimed is:

1. A method for preparing a separator, comprising:
a first step of dispersing a dispersion resin into a solvent to obtain a dispersion solution;
a second step of adding an inorganic material to the dispersion solution, wherein the inorganic material is present in an amount of 10% by weight to 20% by weight;
a third step of mixing a binder with the dispersion solution to form a slurry, wherein slurry particles are present, which comprise a dispersion resin layer surrounding the inorganic material, wherein slurry particles are connected by the binder, wherein particle sizes of the slurry particles included in the slurry are from 1 μm to 3 μm and wherein the slurry particles have a sedimentation rate of from 0.1 μm/s and less than or equal to 1.5 μm/s; and
a fourth step of coating the slurry on at least one surface of a substrate to form a coating layer,
wherein the dispersion resin is a cyano resin including a —CN group,
wherein the inorganic material comprises at least two types of inorganic material particles, and
wherein the cyano resin is one or more types selected from the group consisting of acrylonitrile, cyanoethyl pullulan, cyanoethyl polyvinyl alcohol, cyanoethyl cellulose and cyanoethyl sucrose.

2. The method for preparing a separator of claim 1, wherein the cyano resin further includes an —OH group.

3. The method for preparing a separator of claim 1, wherein a content of the dispersion resin in the slurry is from 0.1% by weight to 3% by weight, based upon the total weight of the slurry.

4. The method for preparing a separator of claim 1, wherein the inorganic material is selected from the group consisting of inorganic material particles having a dielectric constant of 5 or greater, inorganic material particles having a lithium ion transfer ability, and a mixture thereof.

5. The method for preparing a separator of claim 1, wherein the method further comprises mixing the two or more types of inorganic material particles prior to the first step.

6. The method for preparing a separator of claim 1, wherein the binder is one or more types selected from the group consisting of a polyvinylidene fluoride (PVDF)-based copolymer, chlorotrifluoroethylene (CTFE), polyethylene glycol (PEG), polypropylene glycol (PPG), toluene diisocyanate (TDI), polymethyl methacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, pullulan, carboxylmethyl cellulose, an acrylonitrile-styrene-butadiene copolymer and polyimide.

7. The method for preparing a separator of claim 1, wherein the coating method is one or more types selected from the group consisting of spray, inkjet, laser printing, screen printing and dispensing methods.

8. The method for preparing a separator of claim 1, wherein the coating layer has a thickness of 20 μm to 25 μm.

9. A separator prepared using the method of claim 1.

10. The separator of claim 9 comprising:
a substrate; and
a coating layer coated on at least one surface of the substrate,
wherein the coating layer includes core-shell-type slurry particles including a core including an inorganic material, and a shell including a dispersion resin surrounding the core.

11. An electrochemical device comprising:
a positive electrode;
a negative electrode; and
a separator provided between the positive electrode and the negative electrode,
wherein the separator is prepared using the method of claim 1.

12. The electrochemical device of claim 11, which is a lithium ion battery.

* * * * *